Figure 1:
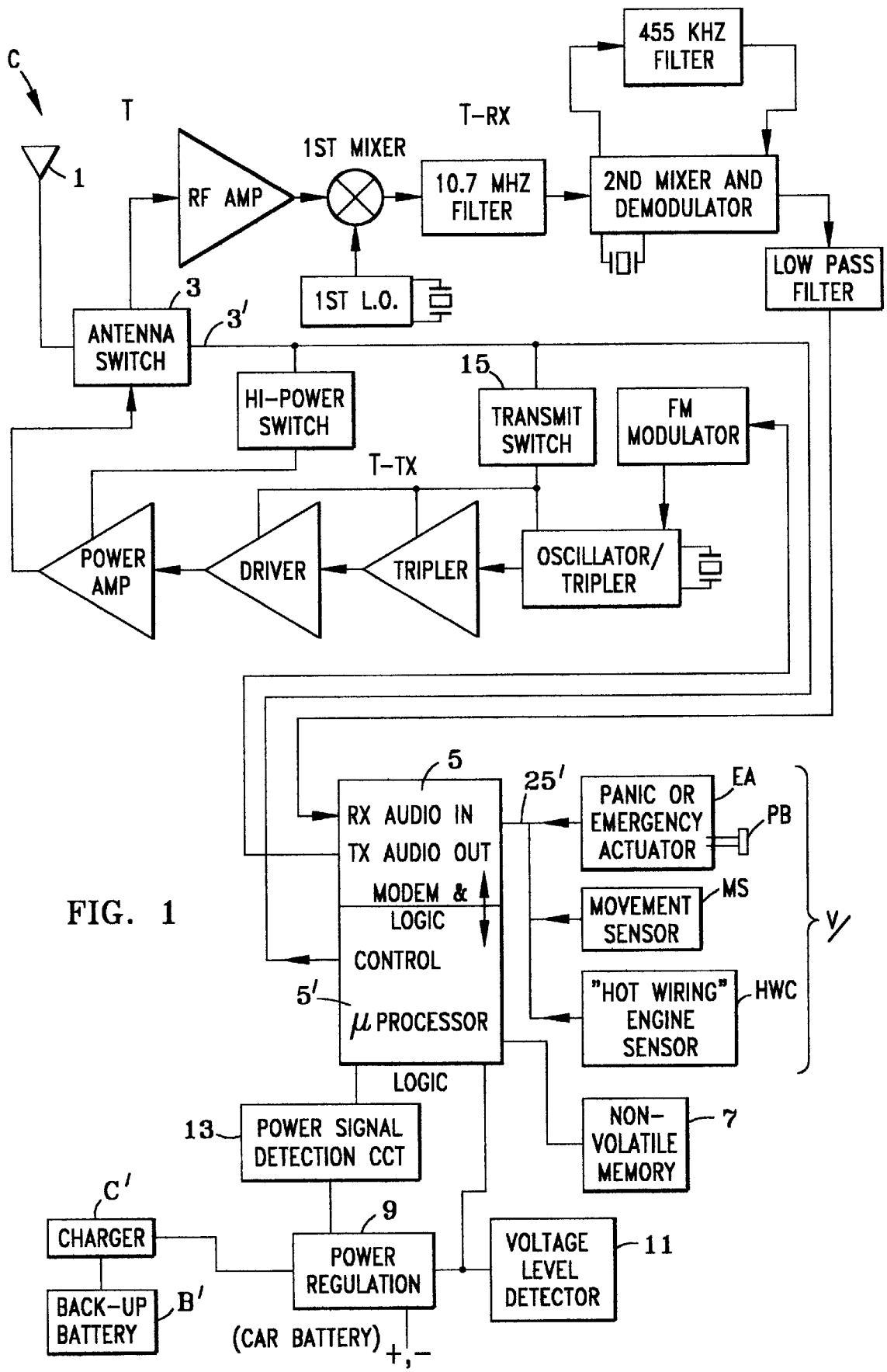

United States Patent
Duvall

[19]

[11] Patent Number: 5,917,423
[45] Date of Patent: Jun. 29, 1999

[54] VEHICLES TRACKING TRANSPONDER SYSTEM AND TRANSPONDING METHOD

[75] Inventor: William R. Duvall, Sudbury, Mass.

[73] Assignee: LoJack Corporation, Dedham, Mass.

[21] Appl. No.: 08/873,850

[22] Filed: Jun. 12, 1997

Related U.S. Application Data

[63] Continuation of application No. 08/420,409, Apr. 12, 1995, abandoned.

[51] Int. Cl.$^6$ .................................. G01S 5/02; G01S 3/02
[52] U.S. Cl. ............................... 340/825.37; 340/825.49; 342/44; 342/457
[58] Field of Search ................. 340/825.37, 825.49, 340/539; 342/44, 457

[56] References Cited

U.S. PATENT DOCUMENTS

| | | | |
|---|---|---|---|
| 4,083,003 | 4/1978 | Haemmig | 23/224 |
| 4,818,998 | 4/1989 | Apsell et al. | 342/44 |
| 4,908,629 | 3/1990 | Apsell et al. | 340/342 |
| 4,918,425 | 4/1990 | Greenberg et al. | 340/539 |
| 5,003,317 | 3/1991 | Gray et al. | 342/457 |
| 5,051,741 | 9/1991 | Wesby | 340/825.49 |

*Primary Examiner*—William A. Cuchlinski, Jr.
*Assistant Examiner*—Yonel Beaulieu
*Attorney, Agent, or Firm*—Rines and Rines

[57] ABSTRACT

A vehicle-tracking radio transponder used in stolen vehicle recovery systems and in which the same transponder is also synergistically accessed for panic or emergency operator activation and for sensed unauthorized moving or starter circuit tampering independently of and without interfering with the stolen vehicle recovery command signal control of the transponder.

11 Claims, 2 Drawing Sheets

VEHICLES TRACKING TRANSPONDER SYSTEM AND TRANSPONDING METHOD

This is a file wrapper continuation application of parent application Ser. No. 08/420,409, filed Apr. 12, 1995, now abandoned.

The present invention relates to systems, apparatus and methods for tracking vehicles and the like, being illustratively described in connection with its important applications to the recovery of stolen or missing automobiles and the like, and more generally to tracking vehicles on operational duty, such as taxis and other carriers and the like.

BACKGROUND

In U.S. Pat. Nos. 4,818,998 and 4,908,629 of common assignee with the present invention, an automobile theft detection system and method is disclosed, using concealed transponders in equipped vehicles which respond to police or other broadcast signals sent upon notification of theft of a vehicle, providing periodic encoding to transponder reply signals unique to the vehicle for receipt by a recovery police car to home in on and track in order to recover or locate the vehicle.

This system has been working admirably well for a number of years as described, for example, in the assignee's 1989 brochure entitled "LoJack Stolen Vehicle Police Recovery Network".

There are occasions, however, where the vehicle operator may actually be present in a vehicle when the operator or vehicle is threatened, and in which it would be most advantageous for the operator, totally independently of the automatic stolen vehicle operation of the vehicle transponder, promptly, simply and directly to access the system, by manual button or other control, instantly to activate the transponder to begin sending its periodic coded identification signals—this time as an indication of panic or emergency or the like—with the police system thus alerted to locate the vehicle, just as if it had been stolen.

Similarly, even before the vehicle owner learns that the vehicle has been stolen, it is also possible synergistically to use the transponder system, again totally independently of the automatic stolen vehicle operation, when some preliminary unauthorized action is taken against the vehicle; for example, tampering or starting to rock or otherwise move the vehicle, or altering the engine starter circuit or by applying "hot wiring".

It is to the ready incorporation of these important added uses of the same transponder system, irrespective of and without interfering with the automatic stolen vehicle operation of the system, that the present invention is thus primarily directed.

OBJECTS OF INVENTION

A principal object of the invention, therefore, is to provide a new and improved radio transponder apparatus of the character described in which the same transponder may be activated by the vehicle operator, for panic, emergency or similar conditions, synergistically with and independently of the continued capability of the system to operate the transponder automatically in response to broadcast signals from a stolen-vehicle alerting system.

A further object is to provide a novel apparatus for also permitting extension of such additional and independent transponder activation in the event of unauthorized tampering or other movements or action against the vehicle, and "hot wiring" or other interfering with the engine starter circuits.

Other and further objects will be explained herein-after and are more particularly pointed out in the appended claims.

SUMMARY

In summary, however, from one of its important viewpoints, the invention embraces transponder apparatus for use in identifying the presence of an object such as a vehicle interrogated by broadcasted radio activation command signals on a predetermined RF carrier carrying encoded information unique to that object and its transponder, the apparatus having, in combination, means for receiving said command signals and for decoding the encoded identification and verifying that the same is the unique code of said object and its transponder; means operable in the event of such verification, for activating the transponder to transmit periodic reply siqnals on the same carrier frequency and including unique reply code identification thereupon; and means operable independently and irrespective of the receiving of said command signals for also activating the transponder instantly to transmit its unique reply code identification in response to the activation of one or both of panic or emergency manual activation means, and means for automatically sensing an unauthorized action upon the object.

Preferred and best mode designs and implementations are later described.

DRAWINGS

Figure 2:
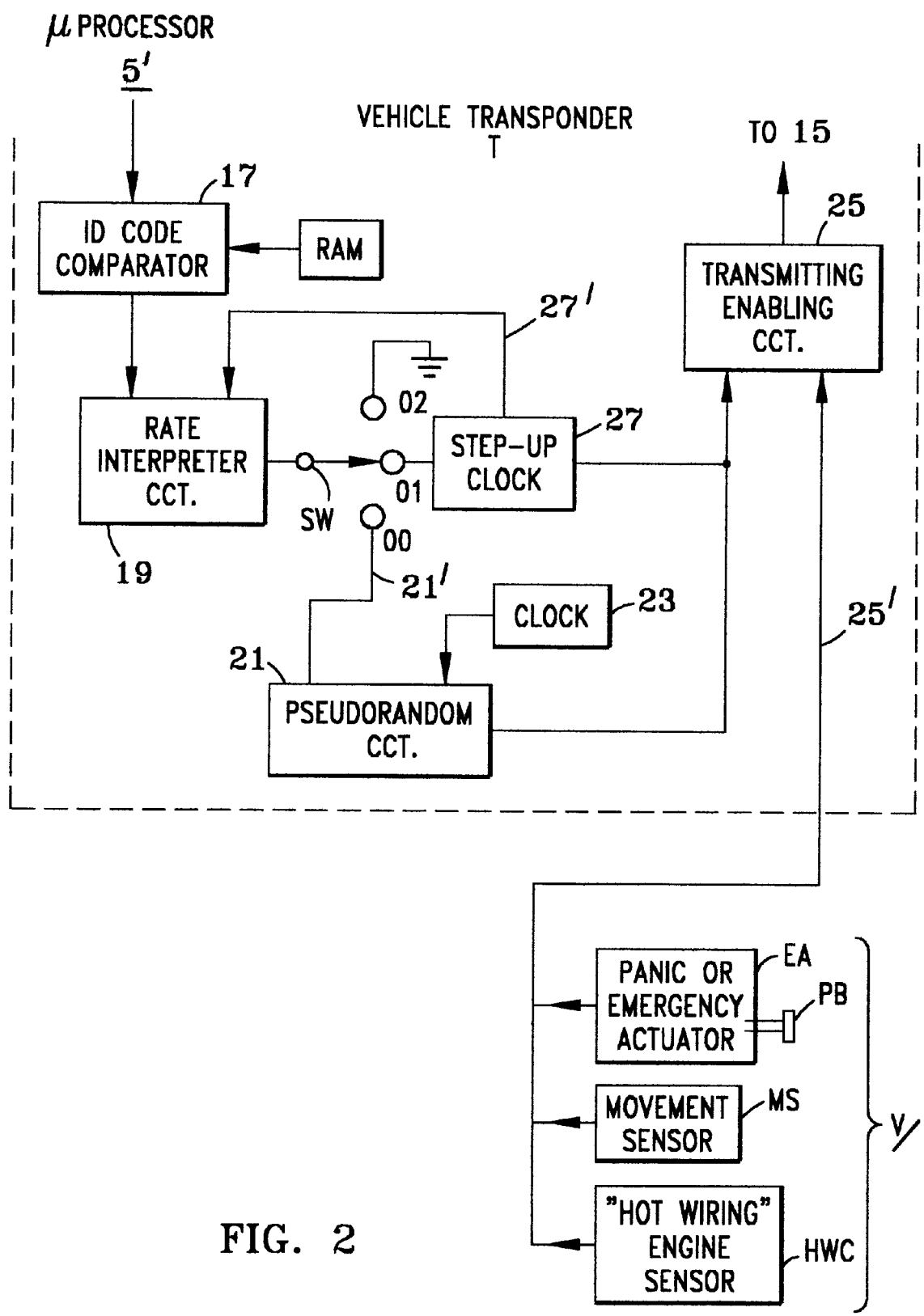

The invention will now be described with reference to the accompanying drawings, FIG. 1 of which is a block diagram of the preferred transponder circuit described in said patents, modified to provide the novel results of the present invention; and FIG. 2 is a more detailed diagram of the transponder microprocessor control of the transponder coded reply activation, again modified to enable the supplemental uses and functions of the invention.

DESCRIPTION

A description, first, of the overall philosophy and methodology underlying the total system operation of the invention in preferred form is in order, as set forth in said patents.

When a vehicle V equipped with the transponder T of the present invention is lost, the owner reports that fact to the local police department which, in turn, reports to a central computer station system for checking against a subscriber list; and if a match is found, a computer message will be sent that includes a unique activation code and a unique reply code for the transponder of the stolen vehicle, and a description of the vehicle. This initiates the transmitting of the activation code from a series of radio broadcasting transmitting antennas, thereby causing the stolen vehicle transponder, if in the area or sector, to activate with a certain probability. The activator code is broadcast periodically until a report is received at C that the car has been retrieved by tracking police cars or until some predetermined time interval has been exceeded.

The frequency of the broadcast transmitters is the same as that of every vehicle transponder; namely, for example, a nationally assigned VHF law-enforcement frequency. But each transponder T transmits a digital coded response or reply of say, about a tenth of a second duration, periodically and preferably at pseudo random intervals, as from once every second to once every ten seconds, roughly.

A police or other tracking vehicle, appropriately equipped with a direction-finding antenna system and a tracking receiver and display, when within range of the missing vehicle, will display on an indicator panel the coded response received from the vehicle transponder; for example, a five-digit alphanumeric code corresponding to the code being transmitted by the vehicle transponder T, as described in said patents. When the police officer sees that display, the officer calls into the radio dispatcher. If it turns out that this is a vehicle that is stolen or that it is otherwise desired to track, then the sector broadcast transmitters will be activated to send out a different transmission distinguished from the first activation signals to vehicle transponders T in that it represents a request to increase the periodicity or rate of vehicle transponder responses or replies. The second, step-up or speed-up reply request command signals have the same vehicle identification number, but a different code in the command section of the message, causing the speed-up, as opposed to just turn-on, all as described in said patents.

When the vehicle transponder receiver receives this increased rate command signal, the transponder circuits will cause the transmission of the coded reply or response message signal from the transponder vehicle to be accelerated to a faster rate of transmission, say about once per second, so that those in the tracking vehicle, instead of seeing the coded number once every ten seconds on the display, will see it once every second or so to aid in homing-in. The transponder will stay in that speeded-up mode for a period of time, say 30 minutes, and then automatically return to the regular mode of transmitting, say, once every ten seconds; the expectation being that within a half hour, the vehicle ought to have been recovered.

In the vehicle transponder unit T of FIG. 1, as described in said patents, when the proper identification code is received in the transponder antenna 1 and receiver circuit (RFAMP, MIXERS, DEMODULATOR, etc), microprocessor 5' recalls its specific reply code from a nonvolatile memory 7, stores it in RAM, and submits the information to the modem 5 which converts the digitally encoded information back into an audio signal. With antenna switch 3 disabling connection to the receiving part (T-RX) of the transponder, the transmitter portion (T-TX), on activation of the transmit switch 15, under control from the microprocessor 5', is modulated to transmit on the same carrier frequency the reply FM signals carrying the unique audio code reply tracking format signal. The microprocessor 5', as also described in said patents, includes an operation for interpreting the broadcast rate command when received with the unique identification code specific to a particular vehicle transponder T.

A schematic implementation of this part of the operation in hardware form is shown in FIG. 2, such being considered as effectively incorporated in the processor 5' of FIG. 1. In actual practice, of course, conventional software control will be provided. The hardware explanation, however, more faciley describes the operational functions. Specific identification (ID) code comparator 17 matches the received identification code with the identification code stored in RAM, after it is accessed from the non-volatile memory 7 of FIG. 1. If the identification codes match, the broadcast rate command is provided to rate interpreter circuit 19 which selects a reply broadcast rate at switch SW. If the rate command is "00", FIG. 2, for example, pseudo random generation circuit 21 is accessed, this delaying signalling transmitter-enable circuit 25 by an additional amount of time represented by a pseudo-randomly generated number. For example, clock 23 may provide a pulse every 8 seconds, and circuit 21 may generate an additional delay period of 0 to 4 seconds, resulting in about once per ten second rate of periodic reply signals as the enable circuit 25 is signalled to commence transmission of these tracking format replies.

In more recent equipment, the accelerated or speed-up mode is operated immediately, then reverts to the "slow" mode after ½ hour, after which a speed-up command can be broadcasted, as above described, to cause the unit to speed-up again,(as for ½ hour), etc. The initial accelerated mode, say once every second, is also particularly useful for the supplemental functions of the present invention, as later explained.

When a step-up or increased reply rate command is received ("01"), such as after a police cruiser nears the stolen vehicle, as disclosed in said patents, a step-up clock 27 is accessed, as by switch SW effectively moving to the position shown in FIG. 2. The clock then generates a pulse at short, regular intervals, such as once every second, which triggers enable circuit 25 to continue transponder transmission at that rate and also step up the pseudo-random circuit. After a predetermined period of time, clock 27 signals rate interpreter circuit 19 through line 27, to return to the normal broadcast rate (SW position "01"), whereupon normal reply activation rate continues until a deactivation command "02" is received, at which time switch SW contacts ground to cease transmissions.

In accordance with the improvements of the present invention, however, not only is the transponder transmitting enabling circuit 25 connected to be activated in the before-described receiver-controlled transmitter tracking modulation format by the control clocks, above-described, in response to the operation of the stolen car alerting and command broadcast signals, but it is separately and independently activatable at 25' by one or more of supplemental trigger circuits EA. The supplemental trigger circuit 25' responds only to the later-described signals generated at MS and/or HWC, each carried by the vehicle V and controlled at the vehicle either by the operator directly, or by the sensing of unauthorized or unintended movement or other unauthorized tampering at the vehicle.

The circuit EA, a panic or emergency pulse signal generator, is operable by the operator (for example, manually) as by push-button PB, or otherwise, triggering the transponder transmitter along the separate path 25' to transmit an emergency radio signal format. Alternatively or supplementarily, the sensing of unauthorized movement or other tampering, (rocking, pushing, hitting, etc.) by a conventional vibration motion sensor MS, will also cause an activation trigger of the transmitting enabling circuit 25. This same activation can be provided by a starter or engine circuit-chanqe sensor, such as a "hot-wiring" addition, or the like, sensed at HWC.

For these supplemental and independent transponder triggering purposes, also, it is preferable to set the before-mentioned 1 second periodic rate of coded transponder identification signal to be initially transmitted, to accelerate police tracking and hopefully permit more prompt closure.

A further protection against car battery failure (or disconnection) may be provided by a back-up battery B', preferably chargeable at C,' as shown in FIG. 1.

Further modifications will occur to those skilled in this art and such are considered to fall within the spirit and scope of the present invention as defined in the appended claims.

What is claimed:

1. A private vehicle protection system for both (1) remote radio tracking of the vehicle, when missing, in response to remote external initiation of broadcast command signals for reception at the vehicle, and (2) vehicle emergency and tampering radio signaling initiated locally at the vehicle itself and independent of said radio tracking, the system having, in combination, transponder apparatus comprising a radio receiver and transmitter combination for use in identifying and tracking the presence of a missing private vehicle if externally interrogated by remotely broadcast radio activation command signals on a predetermined RF carrier carrying encoded information unique to that vehicle and its transducer; the vehicle transponder receiver receiving said command signals and decoding the encoded identification and verifying that the same is the unique code of said vehicle at its transponder; a first trigger circuit operable in the event of and in response to such verification at the receiver for the receiver-controlled activating of the transponder; to modulate its transmitter to transmit a tracking format of periodic tracking reply signals on the same carrier frequency and including unique reply code identification thereupon; sensing means disposed locally at the vehicle for automatically sensing an unauthorized tampering action upon the vehicle while at rest, and generating a signal in response to such sensing; panic and emergency signal generator, provided for user manual operation locally at the vehicle; and a second trigger circuit operable independently and irrespective of the receiving of said command signals by the receiver for separtely activating the transponder transmitter to modulate the transmitter in response to each of any generated sensing and panic and emergency signals, instantly to transmit a unique reply code identification radio emergency signal format from the transmitter distinct from and indepedent of said tracking signal format transmitted upon activation by the receiver.

2. Transponder apparatus as claimed in claim 1 and in which the sensing means detects unauthorized movement of rocking, hitting, pushing, vibration of the vehicle.

3. Transponder apparatus as claimed in claim 1 and in which, in the case of a vehicle, the sensing means detects unauthorized changes in the starting of the vehicle.

4. Transponder apparatus as claimed in claim 3 and in which the vehicle is provided with an engine having a starter, and the sensing means detects unauthorized changes in the starter, including "hot wirinq" of the engine.

5. Transponder apparatus as claimed in claim 1 and in which means is provided for initializing the periodicity of the periodic reply signals to the order of about once every second for each of the command signals, the activating means, and the sensing of an unauthorized action upon the object.

6. A method of identifyinq each of unauthorized vehicle tampering or movement condition, panic or emergency condition, unauthorized changing of the engine starting condition, and vehicle theft condition, and without interfering with and irrespective of one another of such conditions, the method comprising, transmitting, in response to external radio frequency broadcast command signals probing a vehicle theft condition, periodic reply signals on a reply channel of the same frequency and including reply code identification unique to that vehicle; further transmitting said periodic reply signals on the same reply channel with code identification independently in response to internal vehicle manual activation of one or both panic or emergency; and additionally transmitting said periodic reply signals on the same reply channel with code identification independently in response to internal vehicle sensing of any one of unauthorized tampering and movement of the vehicle, and unauthorized engine starting.

7. A method as claimed in claim 6 and in which the periodicity of the periodic reply signals is adjusted at least initially to be of the order of once per second.

8. A private vehicle protection system incorporating both (1) remote radio tracking of the vehicle, when missing, and in response to remote externally initiated broadcast command signals to the vehicle requesting a transponder reply therefrom, and (2) automatic and manual radio emergency signaling locally from the vehicle, the system having, in combination, a transponder comprising a combined radio receiver and transmitter and operable upon the receipt in the receiver of such broadcast command signals, coded for the particular missing vehicle, in the receiver for causing a first trigger circuit from the receiver to activate and modulate the transmitter to transmit a code-identification and periodic radio reply transmission of a predetermined format enabling tracking to locate the vehicle; a sensor at the vehicle for automatically generating signals upon locally sensing tampering with the vehicle; an emergency signal generator at the vehicle manually operable locally by the vehicle user; and a second trigger circuit means connected with the sensor and the emergency signal generator for causing activation and modulating of the transmitter, totally independently of and irrespective of any first trigger circuit activation of the transmitter by the receiver, to transmit a radio emergency transmission format for seeking assistance.

9. A method of protecting private vehicles incorporating both (1) remote radio tracking of the vehicle, when missing, and in response to remote externally initiated broadcast command signals to a vehicle radio-receiver-transmitter transponder requesting reply therefrom, and (2) automatic and manual radio emergency signaling locally from the vehicle, the method comprising, receiving such broadcast command signals, coded for the particular missing vehicle, in the transponder receiver and causing a first trigger circuit from the receiver, to activate and modulate the transmitter to transmit a code-identifying and periodic radio reply transmission of a predetermined format for enabling tracking to locate the vehicle, in the event of local tampering with the vehicle and/or in the event of an emergency thereat, automatically sensing the tampering and/or manually operating an emergency button locally at the vehicle to generate respective emergency signals; and causing a second trigger circuit means responsive to the sensing and emergency signals for causing activation and modulating of the transmitter, totally independently of and irrespective of any first trigger circuit activation of the transmitter by the receiver, to transmit a radio emergency transmission of a different format for seeking assistance.

10. A private vehicle protection system incorporating both (1) remote radio tracking of the vehicle, when missing, and in response to remote externally initiated broadcast command signals to the vehicle requesting a transponder reply therefrom, and (2) automatic and manual radio emergency signaling locally from the vehicle, the system having, in combination, a transponder comprising a combined radio receiver and transmitter and operable upon the receipt in the receiver of such broadcast command signals; coded for the particular missing vehicle, in the receiver for causing a first trigger circuit from the receiver to activate and modulate the transmitter to transmit a code-identification and periodic radio reply transmissions of a predetermined format enabling tracking to locate the vehicle; a sensor at the vehicle for automatically generating signals upon locally sensing tampering with the vehicle; and a second trigger circuit connected with the sensor for causing activation and modulating of the transmitter totally independently of and irrespective of any first trigger circuit activation of the transmitter by the receiver, to transmit a radio emergency transmission format for seeking assistance.

11. A private vehicle protection system incorporating both (1) remote radio tracking of the vehicle, when missing, and in response to remote externally initiated broadcast command signals to the vehicle requesting a transponder reply therefrom, and (2) automatic and manual radio emergency signaling locally from the vehicle, the system having, in combination, a transponder comprising a combined radio receiver and transmitter and operable upon the receipt in the receiver of such broadcast command signals, coded for the particular missing vehicle, in the receiver for causing a first trigger circuit from the receiver to activate and modulate the transmitter to transmit a code-identifying and periodic radio reply transmission of a predetermined format enabling tracking to locate the vehicle, an emergency signal generator at the vehicle manually operable locally by the vehicle user; and a second trigger circuit connected with the emergency signal generator for causing activation and modulating of the transmitter, totally independently of and irrespective of any first trigger circuit activation of the transmitter by the receiver, to transmit a radio emergency transmission format for seeking assistance.

* * * * *